M. K. GRAY.
ARTIFICIAL FISH BAIT.
APPLICATION FILED MAY 4, 1917. RENEWED FEB. 11, 1919.
1,299,703.
Patented Apr. 8, 1919.
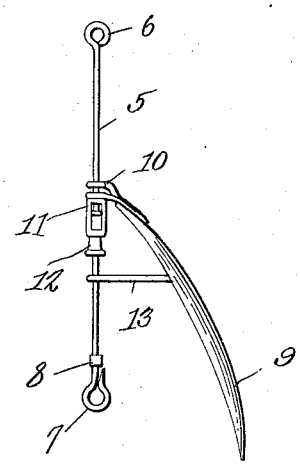
Fig. 1.
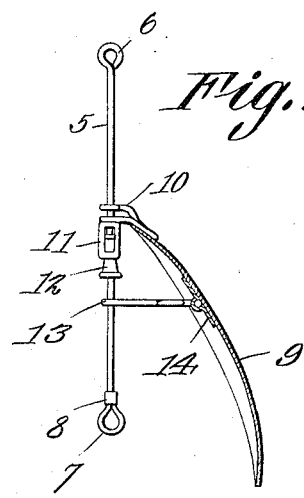
Fig. 2.
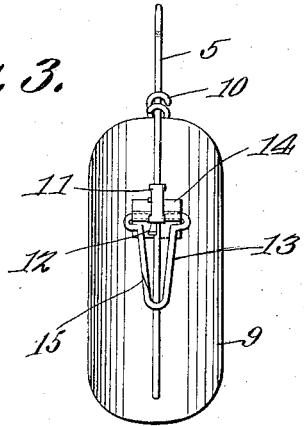
Fig. 3.
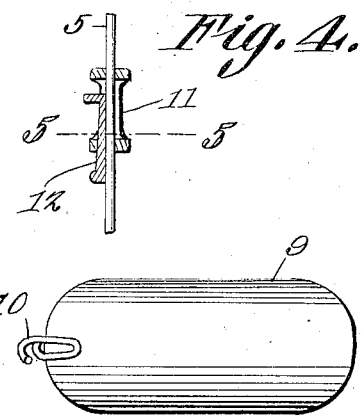
Fig. 4.
Fig. 6.
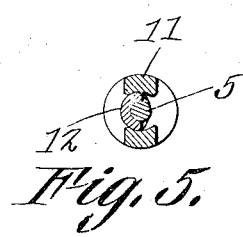
Fig. 5.
Inventor
M. K. Gray
By Milo R. Stevens & Co.
Attorneys

UNITED STATES PATENT OFFICE.

MATTHIAS KING GRAY, OF ODESSA, OREGON.

ARTIFICIAL FISH-BAIT.

1,299,703.  Specification of Letters Patent.  Patented Apr. 8, 1919.

Application filed May 4, 1917, Serial No. 166,469. Renewed February 11, 1919. Serial No. 276,423.

*To all whom it may concern:*

Be it known that I, MATTHIAS KING GRAY, a citizen of the United States, residing at Odessa, in the county of Klamath and State of Oregon, have invented new and useful Improvements in Artificial Fish-Baits, of which the following is a specification.

This invention relates to artificial fish bait or lures known as spoons or spinners, and its object is to make the spoon adjustable and interchangeable for a different sized spoon, this object being attained by means of a noval combination and arrangement of parts to be hereinafter described and claimed.

In order that the invention may be better understood reference is had to the accompanying drawing, forming a part of this specification, in which drawing, Figure 1 is a side elevation of the device, and Fig. 2 is a similar view, partly in section;

Fig. 3 is a front elevation of the device;

Fig. 4 is a sectional detail;

Fig. 5 is a cross section on the line 5—5 of Fig. 4, and

Fig. 6 is a plan view of the spoon detached.

Referring specifically to the drawing, 5 denotes the shank of the bait, the same being a wire having at its upper end an eye 6 and at its lower end a loop 7 for attachment of the hook, said loop being provided with a locking ring 8 slidable on the shank and adapted to be placed over the end of the looped wire to close up the same and prevent the hook from slipping off, and also to conform to the interchangeable features as to size of hook in relation to size of spoon desired.

The spoon 9 is of conventional shape and has at one end a bearing 10 through which the shank 5 loosely passes, and whereby the spoon is rotatably mounted on said shank.

On the shank 5 is adjustably mounted an abutment for limiting the downward sliding movement of the bearing 10 on the shank, the abutment being adjustably positioned on the shank below the bearing. This abutment is a sleeve 11 having a portion of its internal diameter greater than the diameter of the shank so that it may receive a wedge 12 slidably mounted on the shank. This wedge partially encircles the shank and when it is forced into the sleeve it is contracted to grip the shank, and as it is also wedged between the shank and the sleeve, the latter is securely locked on the shank. Upon withdrawing the wedge, the sleeve is released and it may then be slid on the shank to the desired position.

The shank 5 is so loose in the bearing 10, that the spoon 9 is also free to swing toward and from the shank, it being thus pivotally supported. The swinging movement of the spoon, outward of the shank, is limited by a link 13 hinged at 14 to the spoon and straddling the shank. The link is split on one side, as shown at 15, so that it may be slipped over the shank or disengaged therefrom.

The bearing 10 is a piece of wire which is soldered or otherwise fastened intermediate to the spoon 9 and has its ends free and bent into a pair of oppositely presented hooks loosely encircling the shank 5. The spoon can therefore be readily removed from the shank by disengaging the link 13 as hereinbefore described, and bringing the spoon sidewise to a rectangular position from the shank, whereupon the hooks of the bearing 10 will no longer encircle the shank 5, but will be parallel to the same, thus allowing removal of the spoon from the shank.

The construction and operation of the bearing 10 is such that when the spoon is adjusted to the shank, the separation of the two is absolutely dependent upon the release of the link 13 from the shank to permit the last described manipulation of the spoon, and thus all danger of possible loss of the spoon from the shank is eliminated. The spoon is thus detachable from the shank so that a different sized shaped or colored interchangeable spoon may be applied, and the spoon is also adjustable lengthwise on the shank by shifting the abutment 11, the adjustment depending on the size of the spoon employed. The spoon is free to revolve about the shank, and it revolves only up to a certain angle with respect to the shank by reason of the link 13.

I claim:

1. A spoon bait comprising a shank, a spoon having a bearing through which the shank loosely passes to permit rotation of the spoon and a swing outward of the shank, a longitudinally adjustable abutment on the shank behind the bearing, and a loose connection between the shank and the spoon to limit the outward swing of the latter, said connection and the aforesaid bearing being detachable from the shank.

2. A spoon bait comprising a shank, a spoon detachably connected to the shank, a loose connection between the shank and the spoon to limit the outward swing of the latter, said connection being detachable from the shank, and an abutment on the shank to limit the movement of the spoon longitudinally thereof, said abutment being adjustable lengthwise on the shank.

3. A spoon bait comprising a shank, a spoon having at its inner end a pair of oppositely presented hooks loosely encircling the shank to provide a bearing for the spoon, said hooks being detachable from the shank, and the shank being loose in the hooks to permit an outward swing of the spoon, a longitudinally adjustable abutment on the shank behind the bearing, and a loose and detachable connection between the shank and the spoon to limit the outward swing of the latter.

In testimony whereof I affix my signature.

MATTHIAS KING GRAY.

Copies of this patent may be obtained for five cents each, by addressing the "Commissioner of Patents, Washington, D. C."